United States Patent [19]

Shibuya et al.

[11] Patent Number: 5,784,125
[45] Date of Patent: Jul. 21, 1998

[54] PORTABLE LIQUID CRYSTAL DISPLAY DEVICE AND METHOD OF CHANGING THE RECEIVED CHANNEL STATUS OF A PORTABLE LIQUID CRYSTAL DISPLAY DEVICE

[75] Inventors: Hideaki Shibuya, Urayasu; Terutaka Okano, Tokorozawa, both of Japan

[73] Assignee: Citizen Watch Co., Ltd., Japan

[21] Appl. No.: 912,005

[22] PCT Filed: Nov. 4, 1994

[86] PCT No.: PCT/JP94/01864

§ 371 Date: Jun. 12, 1995

§ 102(e) Date: Jun. 12, 1995

[87] PCT Pub. No.: WO95/12878

PCT Pub. Date: May 11, 1995

Related U.S. Application Data

[63] Continuation of Ser. No. 454,213, Jun. 12, 1995, abandoned.

[30] Foreign Application Priority Data

Nov. 4, 1993 [JP] Japan .................. 5-059337

[51] Int. Cl.$^6$ ............................ H04N 5/44; H04N 5/50
[52] U.S. Cl. ............................ 348/570; 348/731
[58] Field of Search ............................ 348/731, 732, 348/790, 570, 569; H04N 5/44, 5/50, 5/445

[56] References Cited

U.S. PATENT DOCUMENTS 5,299,010 3/1994 Nakazawa et al. .................. 348/570
5,315,392 5/1994 Ishikawa et al. .................. 348/570
5,410,361 4/1995 Lee .................. 348/731

FOREIGN PATENT DOCUMENTS

| 0253110 A2 | 1/1988 | European Pat. Off. . |
| 0408892 A1 | 1/1991 | European Pat. Off. . |
| 0561189 A2 | 9/1993 | European Pat. Off. . |
| 54-57893 | 5/1979 | Japan . |
| 55-26757 | 2/1980 | Japan . |
| 55-26760 | 2/1980 | Japan . |
| 1-142284 | 9/1989 | Japan . |
| 3-22771 | 1/1991 | Japan . |
| 3-68247 | 3/1991 | Japan . |
| 3-106213 | 5/1991 | Japan . |

*Primary Examiner*—Michael Lee
*Attorney, Agent, or Firm*—Finnegan, Henderson, Farabow, Garrett & Dunner, L.L.P.

[57] ABSTRACT

A liquid crystal display device for achieving ease of portability, minimally having a liquid crystal display section, a receiving circuit section, a memory section, and a number of switches, a number of receive channel storage means being provided in the memory section, and a function being provided which simultaneously displays the storage status of the receive channel storage means on the liquid crystal display section. The device prevents both erroneous overwriting of a memory location and erroneous storage of the same selected channel in a number of different memory locations, and permits determination of the empty memory locations, and to quickly verify the receivable channels, even in geographical regions in which the receivable channels change.

5 Claims, 5 Drawing Sheets

```
                    —
EMPTY
         1   -   3   4
         -   6       8
         -   8  10  12
        13   -   -  62
```

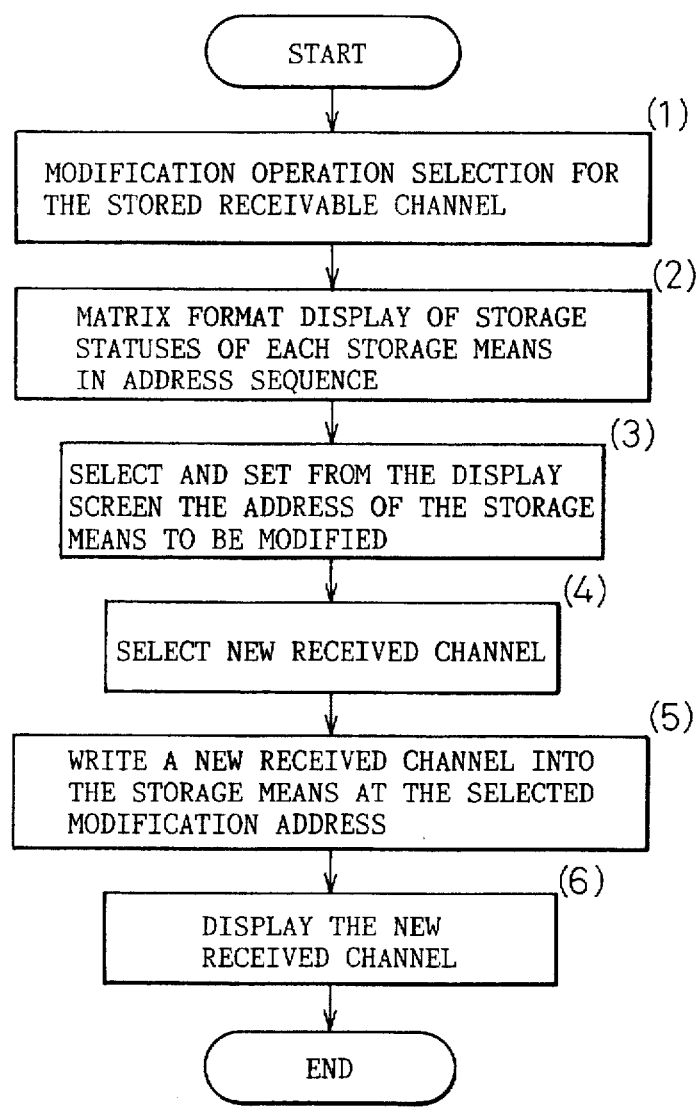

1

PORTABLE LIQUID CRYSTAL DISPLAY DEVICE AND METHOD OF CHANGING THE RECEIVED CHANNEL STATUS OF A PORTABLE LIQUID CRYSTAL DISPLAY DEVICE

This application is a continuation of application Ser. No. 08/454,213, filed Jun. 12, 1995, now abandoned, which is a 371 of PCT/JP94/01864, filed Nov. 4, 1994.

TECHNICAL FIELD

The present invention relates to a portable liquid crystal display device which makes use of a liquid crystal panel, and to a method of changing the received channel status of such a portable liquid crystal display device.

BACKGROUND OF THE INVENTION

A known type of liquid crystal panel is the passive liquid crystal panel in which the construction consists of a liquid crystal material sandwiched between two transparent substrates which are made of glass or film, with electrodes provided on the opposing faces of the two substrates so that they are mutually perpendicular, and the active liquid crystal panel, in which an electrode is provided on one of the opposing faces of two substrates, and a TFT thin-film transistor, MIM (metal-insulator-metal), or the like is formed on the opposing face.

Liquid crystal panels can be classified in terms of operation as TN (twisted nematic) and STN (super twisted nematic) liquid crystal panels, the STN mode of operation being used in passive liquid crystal panels, and the TN mode being used in both active liquid crystal panels and passive liquid crystal panels.

In consideration of the above types of liquid crystal panels, recent years have seen the appearance of commercial product embodiments of a portable TV receiver, which consists of a compact, lightweight liquid crystal display device with a TV reception function, and a liquid crystal display projector, these products taking advantage of the benefits of liquid crystal panels. With this situation as a backdrop, there is a demand for compact, easy-to-operate, low-cost portable liquid crystal display devices.

A liquid crystal TV receiver (hereafter referred to as an LCD TV receiver), which is an example of liquid crystal display devices of the past, will be used to explain the prior art, with reference made to FIG. 3 and FIG. 4. FIG. 3 shows the system block diagram of an LCD TV of the past, while FIG. 4 shows an LCD panel 30, which is the display section which is shown in the system block diagram of FIG. 3.

In FIG. 3, the signal for a desired channel is selected by a tuner 11 from the RF signal that is picked up by an antenna 10, this signal being sent to an intermediate frequency amplifier 12.

The tuning CPU 22 memory address is selected by means of a switching section 20, and a signal 26, which is the channel signal stored in the specified address in memory, is applied to the tuner 11 to select the desired station.

To store the desired channel signal into a specified memory address, the address in the memory of the tuning CPU 22 is selected by a switching operation of the switching section 20, this displaying on the screen the contents of one memory address, so that the signal 25, which is extracted from the intermediate frequency amplifier 12, is stored in memory.

The output of the intermediate frequency amplifier 12 consists of a sound (audio) and a picture (video) signal, the processing of the sound signal being omitted from FIG. 3. The picture signal is input to a color demodulator 14, where it is demodulated into the color signals R (red), G (green), and B (blue).

The output of the color demodulator 14 is applied to a data selector 16, wherein it is wave-shaped, after which the signal is input to the control circuit 18. The data selector 16 has input to it the signal from the switching section 20 and the signal 27 from the tuning CPU 22. At the data selector 16, the output signal from the color demodulator 14 is superimposed to the signal 27, in order to enable the display of superimposed information such as characters on the picture signal.

The output signal from the data selector 16 is input to the control circuit 18, which converts it into a signal that can be displayed as a picture on the LCD panel 30.

Because the liquid crystal display device is a passive type display device, illumination known as backlighting is provided underneath the LCD panel 30, in the form of a backlight 40, which results in a bright screen display. While a fluorescent tube is generally used as the backlight, it is also possible to use electroluminescence or a lamp. It is also possible to position a reflector beneath the LCD panel 30 to utilize the reflection of external light to make the screen bright.

Note that the power supplies and wiring for the power supplies of these backlights and the above-noted circuit blocks are not shown in FIG. 3.

As described above, in the past the address within the tuning CPU 22 memory (individual memory locations) was selected by means of a switching operation by the switching section 20, the signal 26, which is the channel signal stored at the specified memory address, being applied to the tuner 11, so as to select the channel of the desired station, and to store into memory a desired channel signal at a specified address, a switching operation of the switching section 20 was used to select the address in the memory of the tuning CPU 22, so that the signal 25 which is extracted from the intermediate frequency amplifier 12 is stored in that address in the memory of the tuning CPU 22.

With regard to the method of storing a specified channel into a specified address in memory, referring to FIG. 4, first, the screen shown in FIG. 4(a) is displayed and, after verifying that there is no channel currently stored at the specified memory address, the new specified channel is stored, resulting in the screen as shown in FIG. 4(b). Next, a switching operation is performed to obtain the screen as shown in FIG. 4(c), and, after verifying that there is no channel currently stored at the specified memory address, the new specified channel is stored, resulting in the screen as shown in FIG. 4(d).

If at the point at which the switching operation is performed to obtain the display screen shown in FIG. 4(e) there happens to be a channel already stored at the specified memory address, after a check is made that it is acceptable to change the memory channel contents, the new specified channel is stored into memory, resulting in display of the screen shown in FIG. 4(f).

By storing channels in the above-described manner, it is necessary to perform the progressive operations shown in FIGS. 4(a) through 4(f) for each channel, and further necessary to verify the status of memory for each channel before performing channel storage operations, thus making the storage of channels complex, and making this arrangement unsuitable for use in a portable liquid crystal display device.

SUMMARY OF THE INVENTION

The present invention uses fundamentally the following technical constitution in seeking to eliminate the shortcomings of the prior art as described above. Specifically, it is a portable liquid crystal display device that minimally has a liquid crystal display section, a receiving circuit section, a memory section, a plurality of switching means, a plurality of received channel storage means into which are stored the received channel and which are provided in the memory section, and a display control means which displays the storage status in the plurality of received channel storage means on the liquid crystal display section.

According to the liquid crystal display device of the present invention, in addition to providing in the memory section a plurality of received channel storage sections into which are stored received channels, because the storage statuses of all of the plurality of received channel storage sections are displayed on the liquid crystal display section, it is possible to ascertain at a glance the memory storage status, thereby simplifying the operation required for channel storage.

BRIEF DESCRIPTION OF THE DRAWINGS

FIG. 1(a) and FIG. 1(b) are drawings which show the display condition in an LCD TV receiver, which is an embodiment of the present invention.

FIG. 6 is a flowchart which shows an example of the operating procedure of the received channel display changing method according to the present invention.

DESCRIPTION OF THE PREFERRED EMBODIMENT

Figure 2:
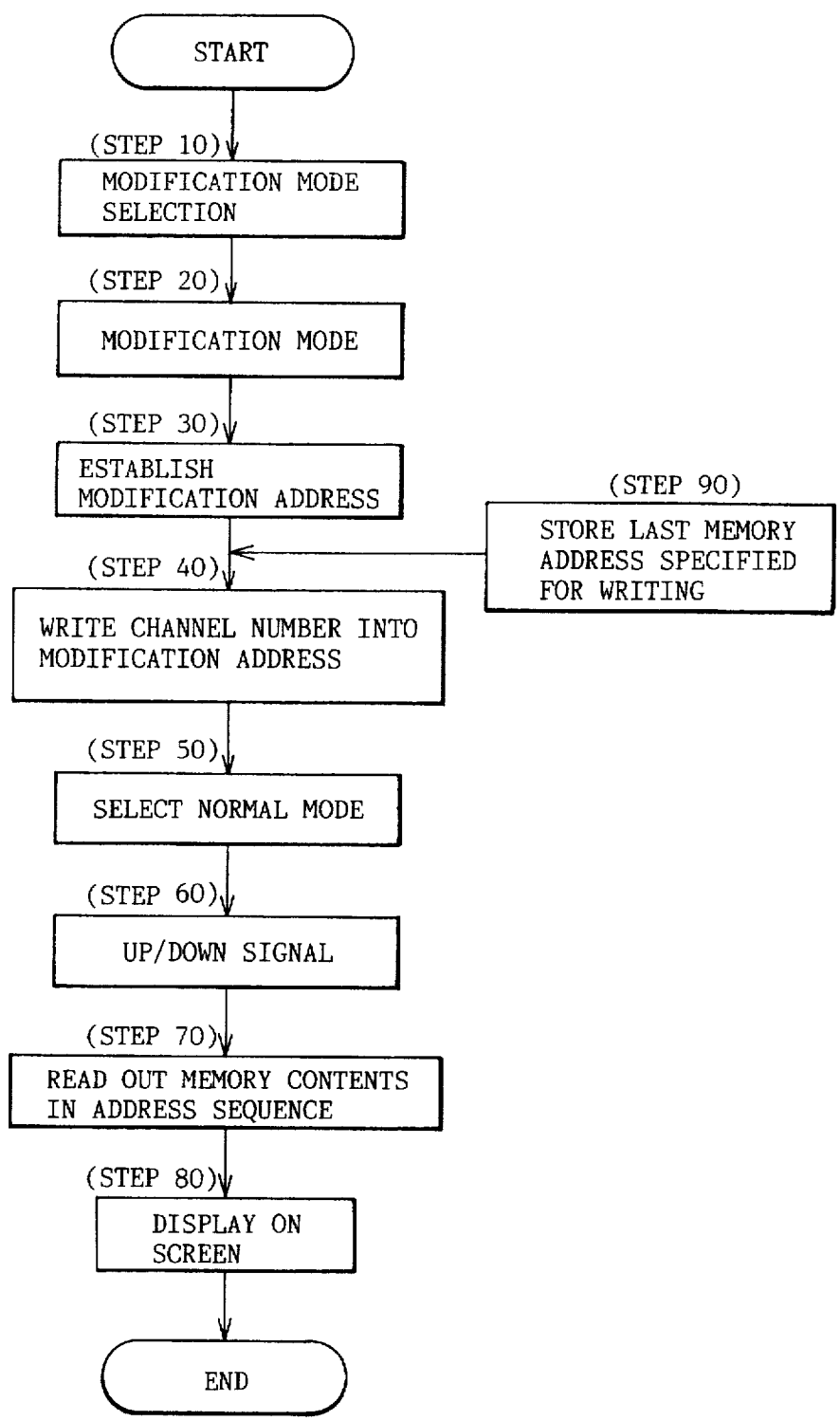
FIG. 2 is a flowchart which shows the operating procedure flow in an LCD TV receiver which is an embodiment of the present invention.

A portable liquid crystal display device, which is in embodiment of the present invention, will be described below, with reference made to FIG. 1, which shows the liquid crystal display device as used in an LCD TV, and FIG. 2, which shows the operational steps to modify the memory contents.

Figure 3:
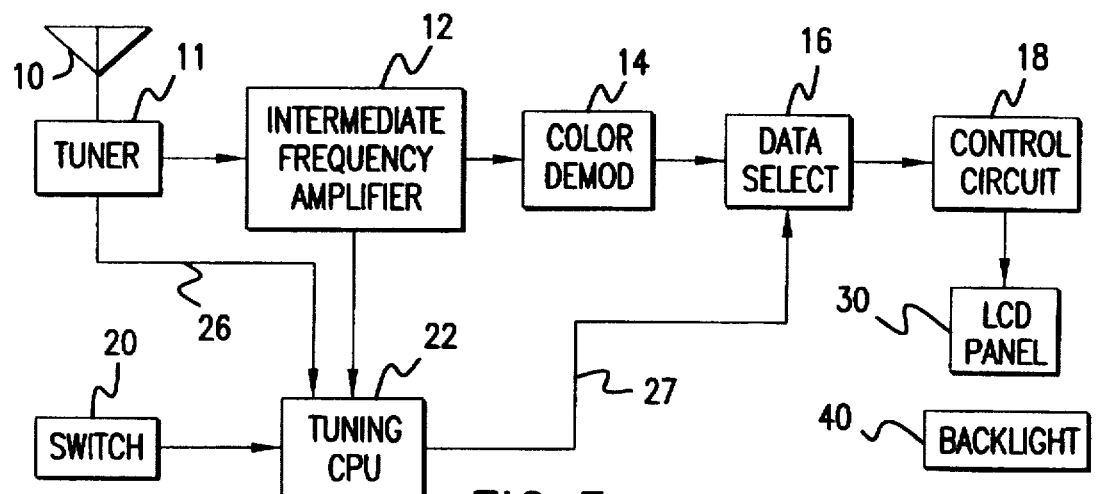
FIG. 3 is a system block diagram of an LCD TV receiver from the prior art.
Figure 4A:
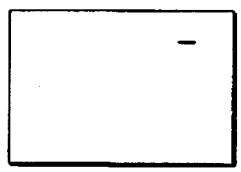
FIGS. 4(a)–4(f) show the display conditions in an LCD TV receiver from the prior art.
Figure 4B:
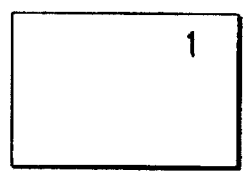
Figure 4C:
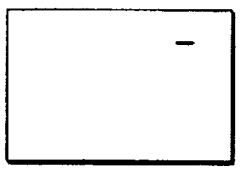
Figure 4D:
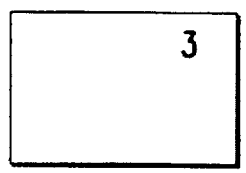
Figure 4E:
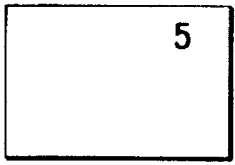
Figure 4F:
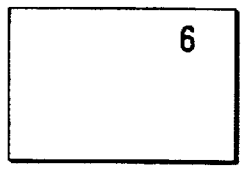

FIG. 1 shows the display generated by a liquid crystal TV receiver (LCD TV) by virtue of the system block diagram shown in FIG. 3.

In the system block diagram shown in FIG. 3, the signal for the desired channel is selected by the tuner 11 from the RF signal that is picked up by an antenna 10, this signal being sent to an intermediate frequency amplifier 12.

When this is done, the address of the memory which is part of the tuning CPU 22 is selected by means of a switching operation of the switching section 20, and the signal 26, which is the channel signal stored in the specified address in memory, is applied to the tuner 11 thereby selecting the desired station.

The output of the intermediate frequency amplifier 12 consists of a sound (audio signal) and a picture (video) signal, the processing of the sound signal being omitted from FIG. 3. The picture signal is input to a color demodulator 14, where it is demodulated into the color signals R (red), G (green), and B (blue).

The output of the color demodulator 14 is applied to a data selector 16, wherein it is wave-shaped, after which the signal is input to the control circuit 18. The data selector 16 has input to it the signal 27 from the tuning CPU 22. At the data selector 16, the output signal from the color demodulator 14 is adjusted to the signal 27, in order to enable the display of superimposed information such as characters on the picture signal.

The output signal from the data selector 16 is input to the control circuit 18, which converts it into a signal that can be displayed as a picture on the LCD panel 30.

Because the liquid crystal display device is a passive type display device, illumination known as backlighting is provided underneath the LCD panel 30, in the form of a backlight 40, which results in a bright screen display. While a fluorescent tube is generally used as the backlight, it is also possible to use electroluminescence or a lamp. It is also possible to position a reflector beneath the LCD panel 30 to utilize external light to make the screen bright.

Note that the power supplies and wiring for the power supplies of these backlights and the above-noted circuit blocks have not been shown in FIG. 3.

To store a desired channel signal into a specified address, after all of the memory contents are displayed on the screen, as shown in FIGS. 1(a) and 1(b), the specified address in the received channel storage section of the memory of the tuning CPU 22 is selected by a switching operation of the switching section 20, voltage data being stored in that address, based on the signal 25, which is extracted from the intermediate frequency amplifier 12.

It is also possible to provide in the tuning CPU 22 a second memory area, into which are stored all channels (for example, channels 1 through 62 in the case of Japan), a means being employed to store the specified channel data from this second memory area into the above-noted specified address.

That is, the fundamental technical constitution of the present invention is that of a portable liquid crystal display device which minimally has a liquid crystal display section, a receiving circuit section, and a plurality of switches, a plurality of received channel storage sections which store the received channel being provided in the above-noted memory section, and a function being further provided which simultaneously displays all of the storage statuses of the plurality of received channel storage sections on the liquid crystal display section, the main purpose of which is to enable the user or operator to easily distinguish the received channel storage status, and to further enable easy modification or deletion of received channels, providing a display, on the liquid crystal display section, of the received channel storage status whenever it is desired to verify this received channel storage status.

The constitution of the portable liquid crystal display device 1 according to the present invention can be explained in more detail as follows, with reference made to FIG. 5. The portable liquid crystal display device 1 according to the present invention minimally has a liquid crystal display section 30, a receiving circuit section 11, a memory section 29, a plurality of switching means 20, a plurality of receiving channel storage means 291 through 29n, which are provided in the above-noted memory section 29 and which store a plurality of received channels, and a control section 28, which is a display control means, having a storage status display means 280 which displays on the liquid crystal display section 30 the storage status in the plurality of received channel storage means 291 through 29n.

That is, in the portable liquid crystal display device 1 according to the present invention, each of the storage statuses of the received channels stored in the plurality of received channel storage means 291 through 29n is displayed simultaneously on the liquid crystal display section 30.

In the present invention, it is also possible for the channel information stored in the plurality of received channel storage means 291 through 29n to be simultaneously displayed on the liquid crystal display section 30, and it is also possible for the stored information for a plurality of received channel storage means which is a subset of the total plurality of received channel storage means to be displayed simultaneously on the liquid crystal display section.

That is, the number of receivable channels could vary, depending upon area of use, and in the case in which there is a large number of receivable channels, it might not be possible to display all the received channels simultaneously on the liquid crystal display section 30, in which case it is possible to have the storage statuses displayed for a plurality of received channel storage means 291 through 29n', which represents a subset of the total of received channel storage means 291 through 29n.

In addition, in the portable liquid crystal display device 1 according to the present invention, the storage statuses of either all the plurality of received channel storage means 291 through 29n or a subset of received channel storage means 291 through 29n', which are in the memory section 29, are simultaneously displayed on the screen (including the case in which nothing has been stored). Therefore, the user or operator can easily understand the received channel information stored in each of the received channel storage means, including which new received channel storage information is to be set into which received channel, and which received channel storage means are empty. And the user or operator can easily judge into which storage means of the received channel storage means 291 through 29n the desired received channel is already stored, the associated required operations being enabled by simultaneously displaying on a single liquid crystal display section 30, as shown in FIG. 1, the storage statuses with regard to the received channels in the plurality of received channel storage means, the information for the currently received channel on the portable liquid crystal display device can be simultaneously displayed on a liquid crystal section 30.

Specifically, in the portable liquid crystal display device 1 according to the present invention, it is desirable that the control section 28 which is display control means have a received channel display means 281 which provides on the liquid crystal display section a simultaneous display of the currently received channel.

In addition, in another form of the portable liquid crystal display device 1 according to the present invention, the display control means 28 further has a selection means 282 which selects one arbitrary received channel storage means of the plurality of received channel storage means 291 to 29n which are currently displayed on the liquid crystal display section 30.

In order for this selection means 282, as described above, to select a specific receiving channel that the user or operator wishes to change, from among the plurality of received channel storage means currently displayed on the liquid crystal display section 30 of the portable liquid crystal display device 1, it operates an appropriate switch which is provided on the above-noted switching means 20, thereby moving an appropriate cursor on the liquid crystal display section 30 to select the desired received channel.

By the above operation, the specific channel selected by means of the cursor is displayed on the screen in, for example, a flashing mode, the received channel information stored at that received channel in the portable liquid crystal display device being displayed in a prescribed position on the liquid crystal display section 30.

Specifically, in the example shown in FIG. 1(a), the received channel in the portable liquid crystal display device currently being selected by the cursor is channel 13, indicating that the channel 13 receivable in that area is stored at the channel 13 location.

If the user or operator wishes, for example, to receive an existing channel 38, in the case in which there exists not even one received channel storage means of the portable liquid crystal display device 1 into which the new channel, channel 38, is currently stored, first the signal of the desired channel is received, and after displaying the desired channel on the liquid crystal display section 30, the selection means 282 is operated so as to move, for example, a cursor to a received channel storage means among the received channel storage means 291 to 29n at which is displayed a "-" that indicates that no received channel is currently stored at the location, that is, the cursor is moved to an empty channel location, thereby causing that location on the display to flash, it then being possible to store the above-noted channel 38 into that received channel storage means.

In this case, the new desired channel need not necessarily be stored into an empty channel location, but can also be stored into a channel location which currently holds a channel, thereby overwriting the previously stored information.

Specifically, the display control means 28 of the present invention further has a storage status changing means 283, which changes the storage status of at least one received channel storage means among the plurality of received channel storage means 291 to 29n which are currently displayed on the liquid crystal display section 30.

The storage status changing means 283 of the present invention either deletes, adds to, or changes the information stored in at least one received channel storage means.

Figure 5:
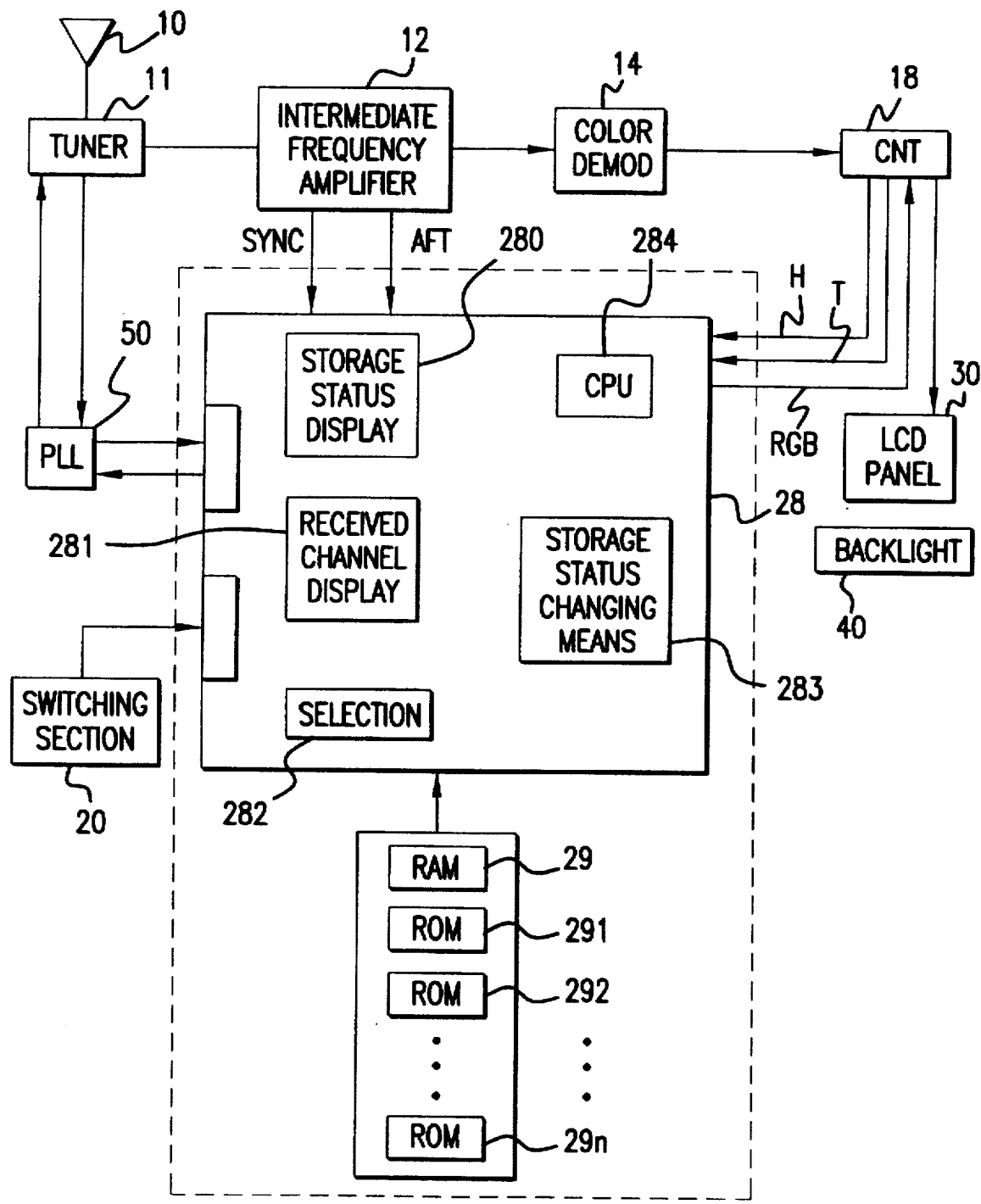
FIG. 5 is a block diagram which shows the configuration of an example of a portable liquid crystal display unit according to the present invention.

In a portable liquid crystal display device 1 having the functions desired above, the configuration is, for example, as shown in FIG. 5.

FIG. 5 is a block diagram which shows an example of the configuration of a portable liquid crystal display device 1 according to the present invention, and while it is fundamentally of the similar configuration to that of the prior art, which is shown in FIG. 3, it is distinguished from the prior art of FIG. 3 in particular with respect to the tuning CPU 22 which is shown in FIG. 3.

Specifically, the basic configuration of a portable liquid crystal display device 1 according to the present invention, as described above, is one in which a receiving circuit section 11 having an antenna 10 is connected to a control circuit 18 through an intermediate frequency amplifier 12 and a color demodulator circuit 14, this control circuit 18 driving the liquid crystal display section 30.

In this configuration, the control section 28 and storage section 29 correspond to the tuning CPU 22 shown in FIG. 3, this control section 28, which is a display control means, is connected by means of an appropriate PLL (phase-locked loop) circuit 50 to the receiving circuit section 11, the channel signal selected by the control section 28 being sent to the receiving circuit section 11, an appropriate selection circuit being used to receive the channel in response to that channel signal.

The frequency of the received signal is locked to the desired frequency by means of the PLL circuit 50.

The intermediate frequency amplifier circuit 12 and control section 28 are connected, this intermediate frequency amplifier circuit 12 sending signals such as a synchronization signal SYNC and an automatic fine tuning synchronization signal AFT to the control section 28.

A plurality of control switches are connected to the control section 28, signals with regard to the selection of the desired mode, execution of various operations, display switching, and changing or updating of the storage status of the storage means being input to this section.

A received channel storage means selection means 282, which appropriately selects a received channel storage means from the plurality of such received channel storage means, and a storage status changing means 283 are provided in the above-noted control section 28, and in addition the control section 28 is provided with a plurality of received channel storage status display means 280, a received channel display means 281, and an arbitrary CPU 284 which comprises an appropriate processing circuit which individually drives the received channel storage selection means 282 and the storage status changing means 283, there also being provided, connected to the control section 28, a memory section 29, which includes a circuit such as a ROM and a RAM, which form the plurality of received channel storage means 291 to 29n.

In addition, the control section 28 receives the horizontal synchronization signal and vertical synchronization signal from the above-noted control circuit 18, and sends the picture signal to this control circuit 18.

The ROM of the above-noted memory section 29 has pre-stored in it, at prescribed addresses, the information for all the receivable channels in a particular area.

Therefore, the required received channel information is read out of the storage means of the memory section 29, this information being displayed on the liquid crystal display section 30, with the picture from the received channel being simultaneously displayed on the liquid crystal display section 30.

Next, the method of modifying the contents of memory, which includes the memory contents writing operation, will be explained, with reference being made to FIGS. 1 and 2. When the modification mode is selected by means of a switching operation by the switching section 20 shown in FIG. 3, (step 10), the modification mode is enabled (step 20), and all the memory statuses are displayed on the screen of the LCD TV receiver, as shown in FIG. 1(a) or FIG. 1(b), with the specified address which is the currently selected memory position flashing in the display. In FIGS. 1(a) and 1(b), this flashing is represented by parentheses (for example, "(13)" in FIG. 1(a)).

In FIG. 1(a), the memory contents are channel 13, and "13" appears in the upper right part of the screen to indicate the memory contents. When it is possible to receive the TV broadcast on channel 13, the received picture is displayed on the background of the screen shown in FIG. 1(a).

In FIG. 1(b), in the case in which a receivable channel has not been stored in the received channel storage means to which a move is made, there are no memory contents (that is, the memory location is empty), this being indicated in the upper right part of the screen by a displayed "-" the word EMPTY also being displayed on the screen to indicate that the memory location is empty.

If it is desired to write into or modify the contents of the flashing location shown in FIG. 1(a) or FIG. 1(b), a switch of the switching section 20 is pressed to move to the address to be specified. For commands which change the contents of or write into memory, a separate address is specified (step 30) and the number of the desired channel is stored at the specified address selected in memory (step 40). By pressing a switch of the switching section 20, operation returns from the modification mode to the normal mode, which is the normal receiving mode (step 50).

When the operation returns to the normal mode, the display of FIG. 1(a) or FIG. 1(b) disappears.

In the normal mode, each time the UP or DOWN switch of the switching section 20 is pressed, an up or down signal, respectively, is input to the tuning CPU 22, this causing the selected channel number to be sequentially changed by incrementing or decrementing, respectively (step 70).

By means of the above-noted channel selection operation, the picture for the selected channel is displayed on the screen (step 80).

Although in the above-described embodiment, the location of memory to be modified is displayed by flashing, it is also possible to change the display color or to underline the contents of the location to be modified, as other methods of flagging this location on the display.

Also, although in FIG. 1 all the memory statuses are indicated in the lower right part of the screen, it is possible, for example, to display this at other positions, such as the center, upper left, or lower left part of the screen.

Furthermore, when the number of the desired channel is stored into the selected memory location (step 40), and a switch of the switching section 20 is pressed to return from the modification mode to the normal mode, to execute the next writing into memory, before the LCD receiver is returned to the normal mode (mode 50), the last memory location into which writing was done is stored (step 90), so that the next writing operation can be started from the address into which the immediately previous writing had been done.

The basic operating procedures for verifying, changing, deleting, and adding to the contents of the stored received channels in the portable liquid crystal display device 1 of the present invention are described in detail below, with reference to the flowchart which is shown in FIG. 6.

After starting, at step (1) the operator or user selects the modification selection step which selects the modification operation for the purpose of changing the information regarding the received channels that are currently stored in each of the received channel storage means, at which point a display step is executed at step (2), this causing a display screen matrix-format display of the storage status of the storage status (including the case in which nothing is stored) of the above-noted receivable channels in the received channel storage means, after which, at step (3), the operator or user operates the switching means, thereby moving a cursor or the like to the desired location on the display screen, while observing storage status of receivable channels in each of the received channel storage means, and by selecting the address of the received channel storage means for the received channel to be modified, a modification address setting step which sets the address of the received channel storage means for the changing, deletion, or addition of the storage status of this received channel is executed.

Next, at step (4), a received channel selection step which selects the received channel to be stored anew in a received channel storage means is performed, after which, at step (5), a modification processing step is executed which stores the new received channel information at the address in the received channel storage means which had been set by the above-noted modification address setting step. After that, at step (6), after completion of the modification processing step, a modification results display step is executed, thereby displaying on the liquid crystal display section the results of updating the storage status of the newly selected received channel storage means contents.

In the present invention, as described above, an easy-to-operate portable liquid crystal display device is provided, which prevents both erroneous overwriting of a memory location (address) and erroneous storage of the same selected channel in different memory locations, and makes it possible at a glance to determine the empty memory locations, and to quickly verify the receivable channels, even in areas in which the receivable channels change.

What is claimed is:

1. A portable liquid crystal display device, comprising:

a receiving circuit section;

a liquid crystal display section;

a memory;

switching means;

storage means in the memory having a memory location for each of a plurality of channels received by the receiving circuit section;

display control means including means for displaying at one time in said liquid crystal display section either a stored or unstored storage status of each of the plurality of received channels in the receive channel storage means, means for changing the storage status of at least one of the plurality of channels of the receive channel storage means of said plurality of channels displayed on said liquid crystal display section after selecting said at least one of the plurality of channels by said switching means; and means for selecting arbitrarily at least one of the plurality of displayed channels from the receive channel storage means.

2. The portable liquid crystal display device according to claim 1, wherein said display means comprises a received channel display means for simultaneously displaying on said liquid crystal display section a received channel.

3. The portable liquid crystal display device according to claim 1, wherein said storage status changing means either deletes or updates the storage status of a received channel stored in the arbitrarily selected channel of the received channel storage means.

4. A method of changing the received channel status in a portable liquid crystal display device having a liquid crystal display, a receiving circuit, a memory, a plurality of switches, a plurality of receive channel storage means in said memory for storing a plurality of received channels, and a display control for displaying in said liquid crystal display the storage status of said plurality of receive channel storage means, said method of changing the received channel status comprising:

selecting a modification operation for changing information with regard to storage in said plurality of receive channel storage means;

displaying on the liquid crystal display, in matrix format and in address sequence, the receivable channels stored in said plurality of receive channel storage means, if any, and the plurality of receive channel storing means having no stored channels, if any;

modifying an address setting by selecting an address of one of the plurality of receive channel storage means to be modified while observing the displayed storage status in matrix format and address sequence of the plurality of receivable channels stored in said plurality of receive channel storage means and displayed on said liquid crystal display;

selecting a received channel to be newly stored in said selected modified address of the one of the plurality of receive channel storage means;

processing the modification by newly storing said selected received channel into the modified address setting of the plurality of receive channel storage means; and displaying the modification results on said liquid crystal display by displaying an updated storage status of the newly selected one of the plurality of receive channel storage means after completion of processing.

5. An apparatus for changing received channel status in a portable liquid crystal device having a liquid crystal display, comprising:

a receiving circuit;

a memory having a plurality of receive channel storage means for storing a plurality of received channels;

a plurality of switches;

means for controlling the display to display in said liquid crystal display the storage status of said plurality of receive channel storage means;

means for selectively modifying the changing of information with regard to storage in said plurality of receive channel storage means;

means for displaying on the liquid crystal display in matrix format and in address sequence the received channels stored in said plurality of receive channel storage means, if any, and the plurality of receive channel storing means having no stored channels, if any;

means for modifying an address setting by selecting an address of one of the plurality of receive channel storage means to be modified while observing the displayed storage status in matrix format and address sequence of the plurality of receivable channels stored in said plurality of receive channel storage means and displayed on said liquid crystal display;

means including the plurality of switches for selecting a received channel to be newly stored in said selected modified address of one of the plurality of receive channel storage means;

means for processing the modification by newly storing said selected received channel into the modified address setting of the plurality of receive channel storage means; and means for displaying the modification results on said liquid crystal display by displaying an updated storage status of the newly selected one of the plurality of receive channel storage means upon completion of processing by said modification processing means.

* * * * *